Dec. 8, 1925.
C. REES ET AL
1,564,491
EVAPORATOR
Filed Oct. 9, 1922
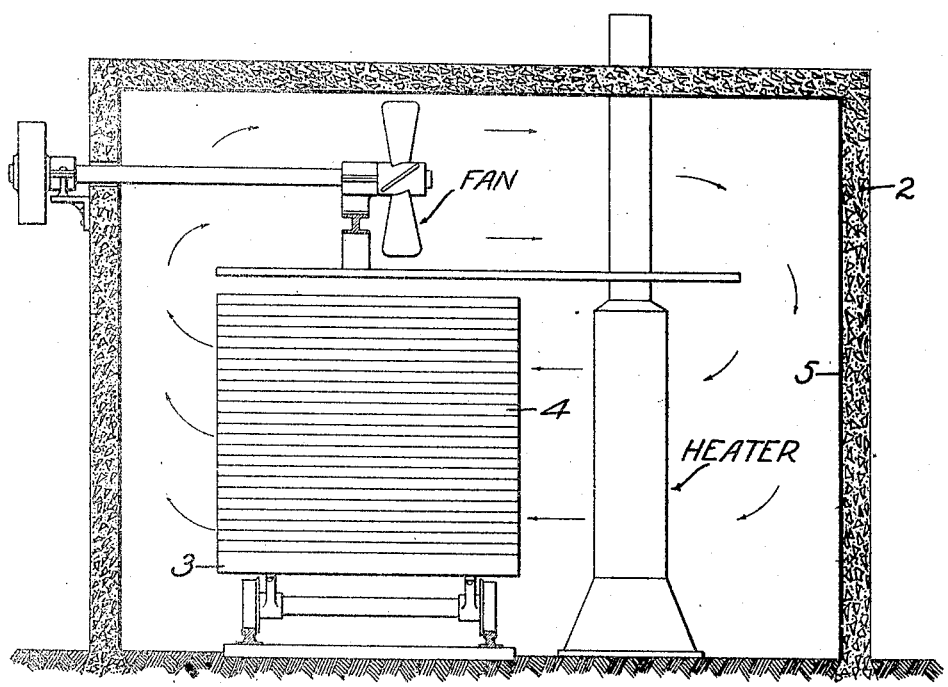
INVENTORS
CLAUDE REES
CHARLES F. HINE.
BY White Prost Evans
their ATTORNEYS.

Patented Dec. 8, 1925.

1,564,491

UNITED STATES PATENT OFFICE.

CLAUDE REES AND CHARLES F. HINE, OF SAN FRANCISCO, CALIFORNIA.

EVAPORATOR.

Application filed October 9, 1922. Serial No. 593,390.

*To all whom it may concern:*

Be it known that we, CLAUDE REES and CHARLES F. HINE, citizens of the United States, and residents of the city and county of San Francisco, State of California, have invented certain new and useful Improvements in Evaporators, of which the following is a specification.

The invention relates to evaporators and particularly to large evaporator houses for drying food products, such as fruits and vegetables.

The drawing is a cross section of an evaporator embodying our invention.

In the commercial artificial drying of fruits, it was at first believed necessary to subject the fruit, arranged on trays, to a stream of dry hot air. It was soon discovered however, that the hot dry air caused the fruit to dry rapidly at its surface, producing a hard shell surrounding an undried inner portion, which was impossible or very difficult to dry. This method of drying produced an undesirable and unmarketable product and was soon abandoned. It was found that this so-called "case hardening" of the fruit could be overcome by increasing the humidity of the air, so that the fruit was subjected to warm moist air. In order to obtain satisfactory results, the humidity of the air must be maintained above a certain minimum and the humidity must be controllable to produce optimum results.

Evaporators of this type usually comprise a house 2 of sufficient size to receive a plurality of trucks 3 carrying stacks of trays 4 of fruit. An evaporator of such type is disclosed in the United States Patent to Rees, No. 1,413,135 of April 18, 1922. The present invention, however, is not limited in its application to the type of evaporator shown in said patent, the reference to the patent being made only for the purpose of illustrating one form of evaporator to which the invention is applicable.

In order to conserve the heat required for drying the fruit, it has been the custom to build these evaporator houses of brick, concrete or hollow tile. In evaporators constructed of these materials it is very difficult to control the humidity of the air within the house and many expedients have been employed to prevent the humidity from going below the minimum required. In some evaporator plants it has been the custom to introduce water into the house to maintain the desired humidity, notwithstanding the fact that the house was full of fresh fruit being dried. This system of maintaining the humidity is wasteful and inefficient due to amount of heat required to vaporize this added water.

In accordance with our invention we have provided means for maintaining the humidity within evaporator houses built of brick, hollow tile or concrete, without introducing free water and without resorting to other means which are wasteful of heat.

We have found that the moisture in the air is absorbed by the walls and other parts of the house made of brick, hollow tile or concrete and that by preventing this absorption of moisture, the humidity of the air may not only be maintained above the minimum but may be readily controlled. Walls made of these materials are very absorbent and absorb and retain a large amount of moisture. We have found that the difficulty encountered in operating evaporator plants of this nature is due to the absorbent quality of the walls of the structure, a condition which was not obvious, as is shown by the practice of introducing free water to compensate for the moisture lost. Operators have been puzzled to ascertain what became of the moisture and not being able to perceive the moisture loss have adopted the expedient of adding water. We have found that the moisture is lost by being absorbed by the absorbent walls of the house and have provided means for preventing this absorption. To accomplish this result we have coated the inside surfaces of the absorbent walls, ceiling, roof and other elements of the structure with a non-absorbent or impervious layer or coating 5. This is preferably accomplished by coating the absorbent surfaces with which the warm moist air contacts, with an impervious, non-absorbent paint, thus sealing the absorbent surfaces from contact with the warm moist air.

We claim:—

An evaporator for food products comprising a house of concrete, bricks, hollow tiles or other absorbent material in which the food product is dried by contact with warm moisture-laden air, a heater for raising and maintaining the temperature of the air, means for passing the heated air over the food product to remove the moisture therefrom and means for maintaining the moisture content of the air by preventing the absorption of the moisture by the absorbent material, comprising a coating of non-absorbent material on the surfaces of the house exposed to the moisture-laden air.

In testimony whereof, we have hereunto set our hands.

CLAUDE REES.
CHARLES F. HINE.